United States Patent [19]

Fumagalli

[11] 4,199,002
[45] Apr. 22, 1980

[54] CONCRETE PUMPING APPARATUS
[75] Inventor: Enos Fumagalli, Milan, Italy
[73] Assignee: Worthington S.p.A., Milan, Italy
[21] Appl. No.: 904,693
[22] Filed: May 10, 1978
[30] Foreign Application Priority Data
  May 20, 1977 [IT] Italy ................. 23783 A/77
[51] Int. Cl.² ................................ F16K 49/00
[52] U.S. Cl. ............... 137/340; 15/104.06 A;
    222/146 H; 137/334
[58] Field of Search ............. 417/900; 222/146 H,
    222/131, ; 180/54 A, 54 R; 137/344, 334, 338,
    341, 340; 15/104.06 A, 3.5, 3.51
[56] References Cited
  U.S. PATENT DOCUMENTS

| 1,433,713 | 10/1922 | Fricker | 137/340 |
| 2,578,080 | 12/1951 | Middlestadt | 222/131 |
| 3,106,344 | 10/1963 | Band, Jr. et al. | 222/146 H |
| 3,108,012 | 10/1963 | Curtis | 15/104.06 A |
| 3,279,383 | 10/1966 | Smith | 417/900 |
| 3,394,025 | 7/1968 | McCune | 15/3.5 |
| 3,570,526 | 3/1971 | Fisco, Jr. | 137/340 |
| 3,714,960 | 2/1973 | Yamada | 137/340 |
| 3,735,769 | 5/1973 | Miller | 137/340 |

Primary Examiner—Martin P. Schwadron
Assistant Examiner—A. Michael Chambers
Attorney, Agent, or Firm—Millen & White

[57] ABSTRACT

This invention relates to an improved concrete pumping apparatus, in particular of the truck-mounted type and adapted to operate at low environmental temperatures.

Said apparatus comprises means which define an essentially closed circuit for circulation of the cooling air of the auxiliary engine controlling the pumping group in heat exchange contact with apparatus components disposed in separate bays to be maintained within well defined temperature ranges above the temperature of the environment, and means for independently adjusting and maintaining the air temperature in each bay. The engine exhaust gases are used to preheat the casting tube.

11 Claims, 7 Drawing Figures

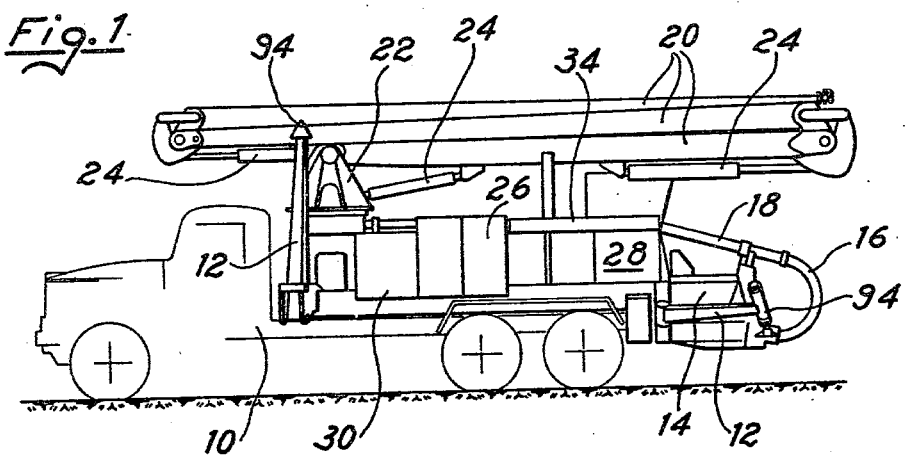
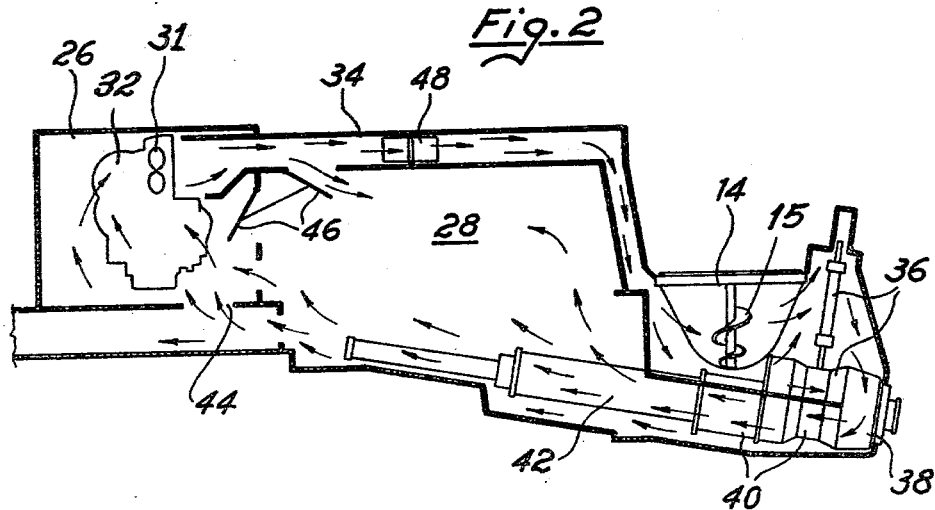
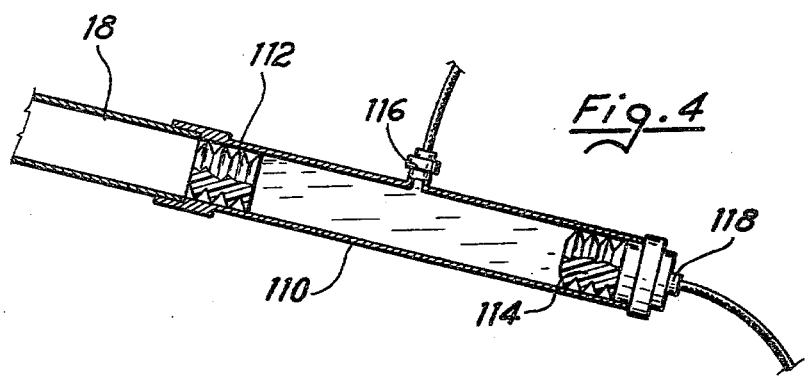

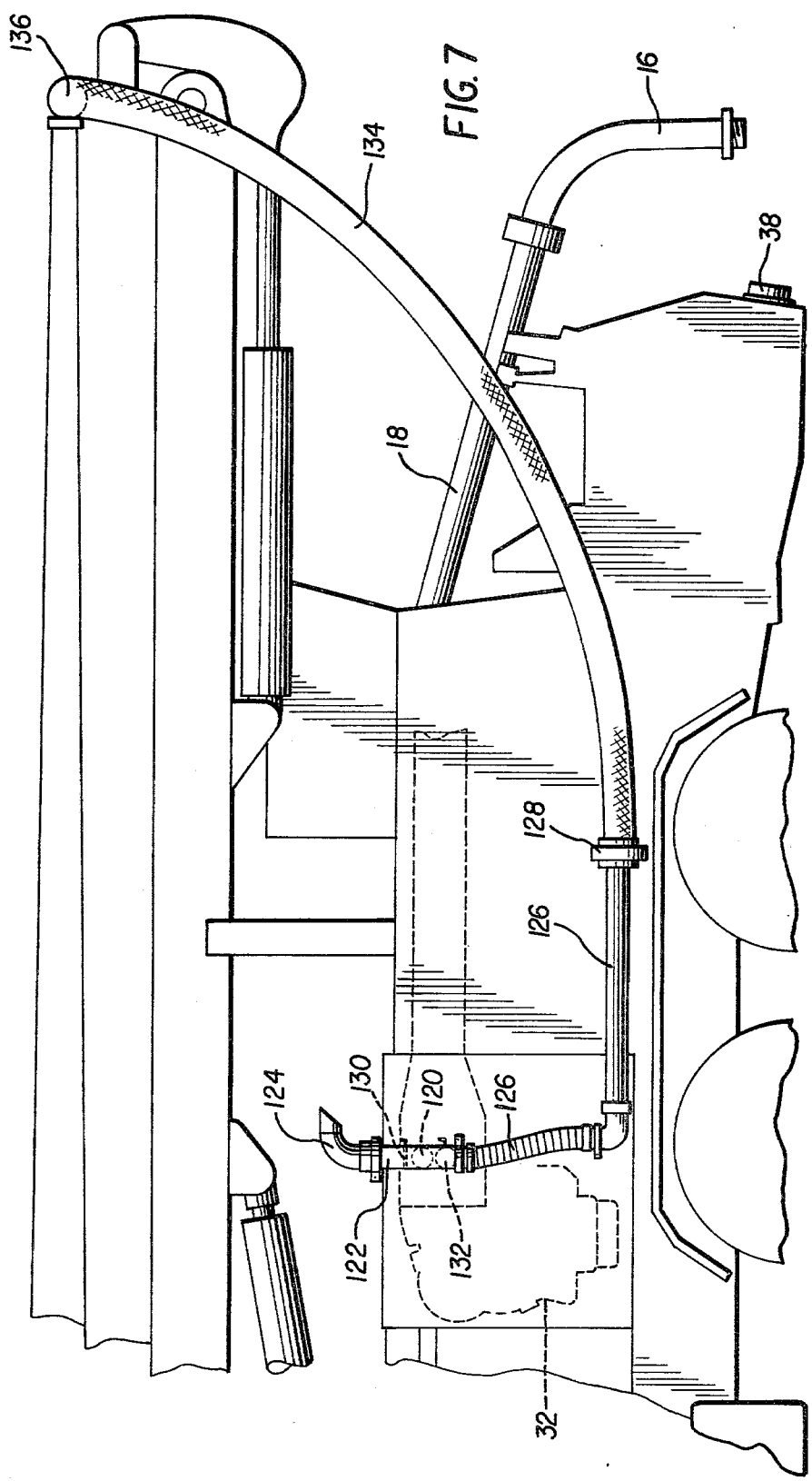

CONCRETE PUMPING APPARATUS

BACKGROUND OF THE INVENTION

1. Field of the Invention

This invention relates to an apparatus, preferably a truck-carried apparatus, for pumping concrete through a casting tube to a casting zone, said apparatus being in particular studied and constructed for operating at very low environmental temperatures, below 0° C. and down to −40° C.

2. Description of the Prior Art

A pumping apparatus of this type essentially consist of a pumping group, preferably a multicylinder type with distributing valves, and driven by its own engine. The pump receives the concrete from a charging hopper and conveys the same into a casting tube formed of several lengths connected and sustained by an articulated arm whose position can be adjusted at will. Besides these fundamental components, different devices are provided for accessory tasks and operations, as will be seen hereinafter.

The use of similar apparatuses in environments characterized by low and very low temperatures is, as it may be guessed, subject to a series of noteworthy problems which have not yet been solved and which are essentially caused by the necessity of bringing to and keeping the major part of the components of the apparatus within well stated temperature ranges, of constantly checking these conditions and obviously assuring in the meantime the perfect operation of all apparatus components in each foreseen operating phase.

In particular, all the apparatus parts coming into contact with the concrete shall be brought to and maintained at a temperature which is superior to 0° C. and less than 30° C., while other mechanical parts shall be preheated or heated to avoid excessive thermal stresses which might cause their breaking. It is evident that it is not convenient nor thinkable to ensure the heating of all these components and in particular that of those having a considerable thermal mass and inertia, such as the pumping and hopper groups, using for this purpose conventional systems of the electric resistance type, because of the excessive loads these systems would involve for the power generators of the apparatus.

OBJECTS OF THE INVENTION

For this reason, to solve these and other problems particularly connected with the above-mentioned use at low temperatures, an apparatus of this type has been studied according to this invention which shows a series of new features which will allow its use in critical environmental conditions always with the maximum safety and reliability, ensuring at the same time the highest economy in the construction and building of the apparatus itself.

SUMMARY OF THE INVENTION

Briefly, these and other objects of the invention have been achieved by providing, in an apparatus for pumping concrete, comprising a concrete loading hopper, pump means operably associated with the hopper for pumping concrete from the hopper and through a casting tube, and an internal combustion engine for operating the pump means, said engine being the source of a current of relatively warm air;

the improvement which comprises containing means defining an enclosure which encloses the pump means, the hopper and the engine, and further including sectional elements defining a plurality of adjustably intercommunicating bays within which the hopper, the pump means and the engine are separately disposed;

duct means for controllably circulating the relatively warm air to the exterior surfaces of the hopper and pump means, so that the relatively warm air is in indirect heat exchange therewith; and valve means for separately controlling the air flow rate to the hopper bay, the pumping means bay and the engine bay so that the air temperatures in each bay may be independently adjusted and maintained; whereby the apparatus is adapted to operate at low environmental temperatures.

BRIEF DESCRIPTION OF THE DRAWINGS

FIG. 1 is a diagrammatical side view of a truck-carried apparatus for pumping concrete, according to this invention.

FIG. 2 is a diagrammatic cross-section of the essentially closed circuit for conveying the cooling air of the auxiliary engine, to heat parts of the apparatus as shown in FIG. 1.

FIG. 4 is a cross-section showing a fixture device for cleaning the casting tube at the end of the concrete casting operations.

FIG. 7 is a sectional view of the detachable connection between the engine exhaust and the casting tube during a preheating stage.

DESCRIPTION OF THE PREFERRED EMBODIMENT

Figure 3:
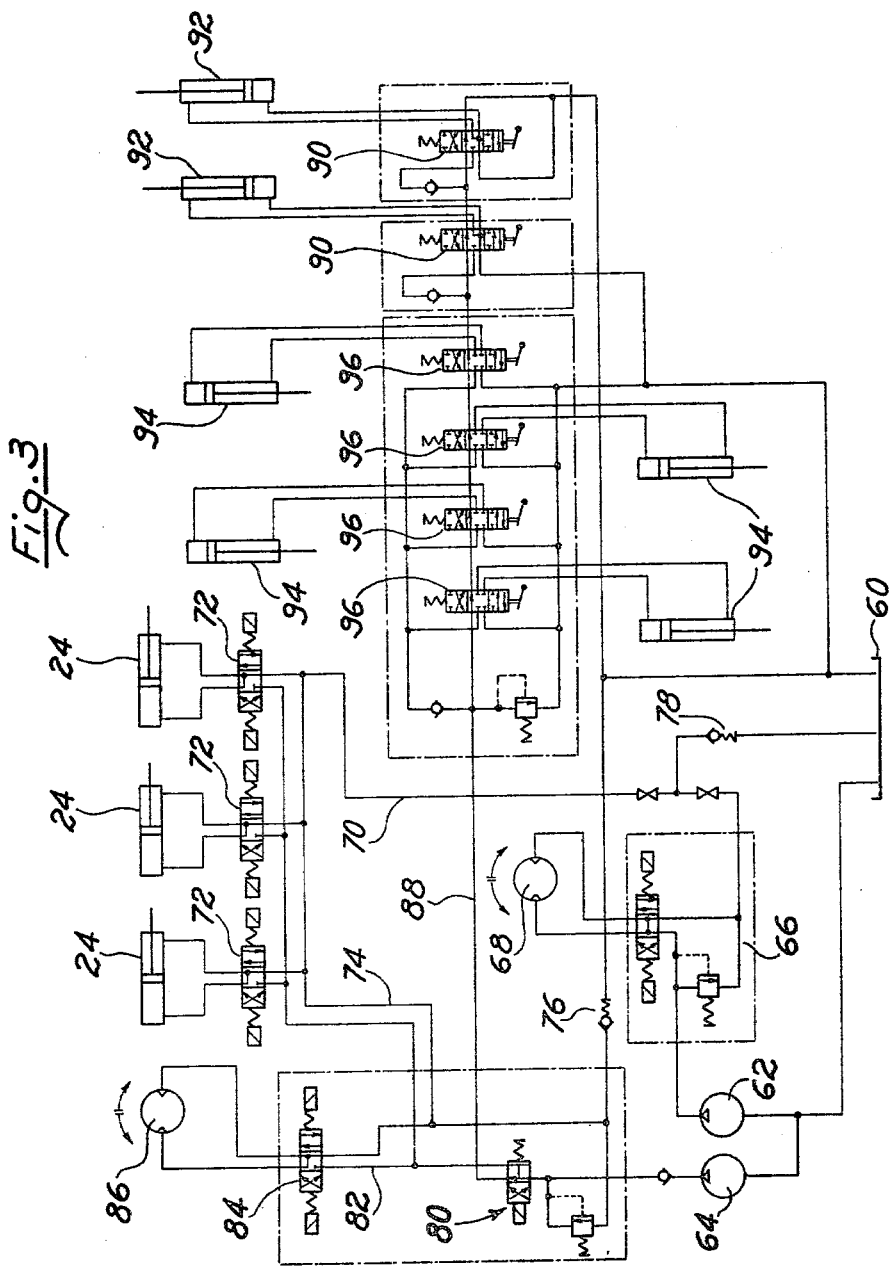
FIG. 3 is a diagram of the hydraulic control circuit for the operation of the arms, the concrete feeding screw and the apparatus stabilizing cylinders.

With reference to the above-mentioned drawings, the shown concrete pumping and casting apparatus is assembled for example on a truck 10 and is provided with jack devices 12, 94 for supporting it on the ground during the pumping operations. Essentially, this apparatus consists of a pumping group collecting the concrete from a charging hopper 14 having a mixing and feeding screw 15 therein and conveying it, through a fitting 16, to a tube 18 sustained by an articulated arm 20 fixed to a rotating tower 22 and adjustable in position by means of hydraulic control cylinders 24. The pumping group, consisting of an inlet port 40, one or more cylinders 42, an outlet port 38 and one or more valve control devices 36, and which is shown in more detail in FIG. 2, is driven by an auxiliary Diesel engine housed in a bay 26, while another bay 28 contains different fixture and servicing devices of the apparatus and a bay 30 contains air compressing and water pumping means for washing and cleaning the apparatus portions in contact with the concrete, as well as water and oil tanks for the different operations, comprising that of driving the pumping group and the hydraulic control cylinders 24 of the arm 20. As already said, the shown apparatus is adapted to operate at extremely low environmental temperatures and in particular down to −40° C. so that it is therefore necessary that the various components thereof reach a minimum steady state temperature before entering in operation. In particular, all the parts coming into contact with the concrete shall have a temperature greater than 0° C., but this temperature shall be so controlled that it does not exceed 30° C., to avoid the drying of the lubricant film allowing the concrete to slide along the walls with which it comes into contact. These problems are solved, according to this invention, by using preheating modalities and means and by maintaining the operating temperature at a level appropriate to the operating requirements of each component of the apparatus.

In particular, preheating said components and maintaining the steady-state temperature thereof, in case of components having a great thermal mass and inertia, such as the charging hopper 14 and the pumping group, are ensured by making use of the fan 31 and cooling air of the auxiliary engine 32 (FIG. 2) housed in bay 26. This cooling air, when leaving the engine bay, is conveyed into a duct 34 leading the same to the outside of the hopper 14, the control device 36 of the distributing valve of the pumping group, the pumping group portions 38 and 40 in contact with the concrete, the cylinders 42 of the pumping group and then at least partly the fixtures and devices in bay 28. The air returns again into the engine bay 26 through opening 44. For the purpose of maintaining a suitable temperature in said bay 26, a double flap valve 46 is provided to control both the inflow of cooler air into the bay 26 and the outflow of the heated air downstream the engine 32. The upper flap controls the flow of warm air through duct 34 to the hopper bay relative to the flow into the bay containing the pump cylinders and various auxiliary devices. As shown in FIG. 2, the lower flap is connected by an adjustable arm, and admits a proportional quantity of air from bay 28 to bay 26. Valve 26 is adjustable in such a manner as to maintain in the engine bay a temperature between 10° C., and 30° C., suitable for the operation of the engine itself.

The duct 34 is still further provided with a throttle 48, typically a butterfly valve, allowing regulation of the hot air flow being conveyed to the pumping group, in order to adjust the temperature of this chamber up to 40° C.

For starting the Diesel engine 32, the apparatus is provided with an independent heater (not shown) capable of supplying hot air in quantities and at a temperature sufficient to preheat the engine until it can start even at low temperatures. Always for maintaining the concrete contacting components within given temperature limits, the tubes 16 and 18 are suitably insulated. In particular, these tubes are advantageously formed of different lengths made of wear resistant steel carrying for example, wound thereon in silicon rubber sheaths, electric heating resistances, whose heat is uniformly distributed between the windings by means of a thin aluminium sheet winding adherent to the resistances and tube metal. At the outside is provided an insulating layer of special closed-cell rubber protected in turn by an outside galvanized sheeting. In addition, the connecting joints between the different tube lengths are protected by steel boxes lined on the inside with an insulating rubber foam layer.

According to the temperatures at which the apparatus must operate, said tubes are both preheated and heated successively and continuously, when in steady state operation, during the casting, or else they are only preheated, leaving it to the warm concrete flowing through the tubes to maintain their operation level temperature during the casting phase. Said preheating can be obtained by means of electric resistances, or else, alternatively or jointly, by passing through the tubes, preferably in a counter-current flow, a sufficiently hot fluid, for example steam or in particular the exhaust gases of the auxiliary engine 32. For this purpose a fitting 136 (FIG. 7) is provided between the engine discharge duct and the free end of the tubing for ensuring a temporary connection sufficient to raise the temperature of the tube. This connection is preferably made so that the hot fluid flows in countercurrent as compared to that of the concrete, as the free end of the tube, at which the concrete arrives already slightly cooled, it to be heated at a greater degree.

As illustrated in FIG. 7, a pipe (not shown) leads from the engine muffler through an inlet 120 to a T-section 122 which is connected on one side to an exhaust pipe 124 and on the other side to a conduit 126 leading to an outlet fitting 128. A section of flexible conduit 134 provides a temporary connection between the outlet 128 and a fitting 136 preferably on the outlet end of the casting tube. The inlet section of the casting tube 16 is detached from the pump outlet 38 during the preheating stage, to allow the exhaust gases to vent to the atmosphere. Two butterfly valves 130,132 at either side of the T coact to control the flow of exhaust gases. Valve 132 is open and valve 130 is closed during the preheating phase.

Figure 5:
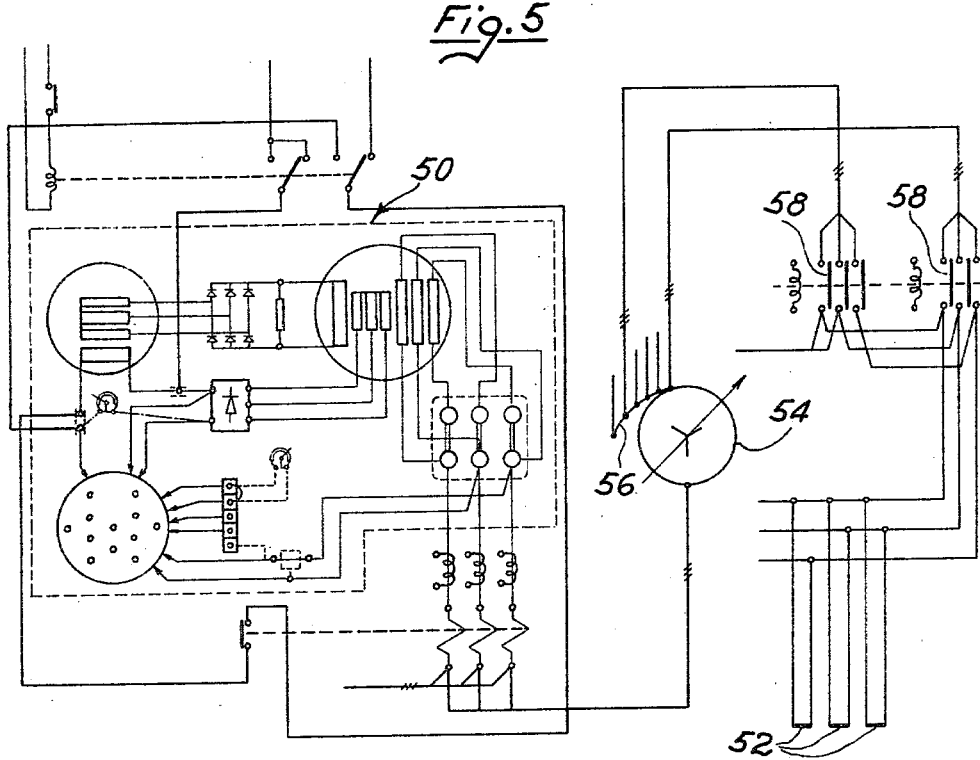
FIG. 5 is an electric diagram showing the connection modalities of the tube heating resistances according to an embodiment of this invention.

As already stated, the tube can also be preheated and heated during the casting operations by means of resistances wound thereon, with the connection in parallel of the different resistances relative to the various tube lengths. The resistances are supplied by a three-phase alternator 50 (FIG. 5) of the constant voltage type, driven by a hydraulic motor whose circuit is controlled alternatively by two pumps, one connected to the auxiliary engine 32 and the other one, for emergency use, with a power socket on the truck engine. The outlet of the alternator 50 is connected, for supplying the heating resistances 52 of the tubes, to an autotransformer 54 of the three-phase type with star-connection a plurality of outlets 56 at different voltages, which may be alternatively connected by change-over switches 58 so as to supply different amounts of power to the resistances 52, in particular a higher voltage and a higher power for starting the preheating phase of the tubes and a steady-state voltage and power for maintaining the tube temperature during the casting phase.

As already stated, other parts of the apparatus may require heating by means of resistances, in particular the driving cab, the cylinder washing water tanks. Oil is required both for the main control circuit of the pump group and for the electric power generator, as well as for the operation of auxiliary devices comprising the concrete mixing screw and the hydraulic control valves for controlling the movement of the casting tube support arm and the stabilizing jacks.

In particular, the latter circuit is supplied from a tank containing aeronautic oil with a pour point of −60° C., which is pumped into the screw and made to pass continuously through the valves controlling the movements of the arm, which are exposed on the turret 22 (FIG. 1). These valves are in this manner preheated and maintained at a temperature which prevents the danger of thermal shocks when operated.

The circuit controlling the services is shown in FIG. 3 wherein it is shown that the oil is taken from the tank 60 by means of two pumps 62 and 64 in parallel, the first one conveys the oil through a general valve group 66 to the motor 68 driving the screw. Downstream of the screw the oil is conveyed through a duct 70 and passed through the valves 72 piloting the cylinders 24 controlling the movements of the arm. This flow is continuous as shown by the diagram of FIG. 3 and the return flow of the oil takes place through the line 74 overcoming the resistance of the check valve 76 which is calibrated at a value lower than that of the check valve 78.

The pump 64 supplies a directional valve 80 designed for conveying the oil, alternately, to a duct 82 supplying in turn a valve 84 controlling the movement of the motor 86 ensuring the rotation of the turret 22, or to a duct 88 feeding a set of valves 90 for positioning, by means of cylinders 92, the stabilizing jacks 94 so that they are securely seated on the ground before starting the casting operation, these supporting jacks being piloted by relative valves 96. As already said, the arrangement of the circuit as shown in FIG. 3 is such that the oil heated in the tank 60 and passing through the motor 68, circulates continuously through the valves 72, keeping them at a temperature which is substantially that reached when these valves are operated.

The operations to be carried-out when it is desired to start the pumping operations with the described apparatus in a low-temperature environment, comprise the initial starting of the independent heater for bringing the mass of the auxiliary engine 32 to a temperature allowing its starting. Once the auxiliary engine 32 is running, the cooling air circuit of the same will be sufficient to raise the hopper 14 and the pumping group 36, 38, 40, 42 to the desired steady-state temperature, while the electric power generator driven by the same auxiliary motor 32 ensures the heating of the casting tube and the running of the various auxiliary devices as required for the operation of the apparatus. Alternatively, the casting tube is preheated using the engine exhaust gases, as described above. Once the various parts have reached the operating temperature, the concrete can be normally pumped after having been charged into the hopper and separately prepared according to normal modalities at a temperature which is obviously above 0° C. and below 30° C.

Figure 6:
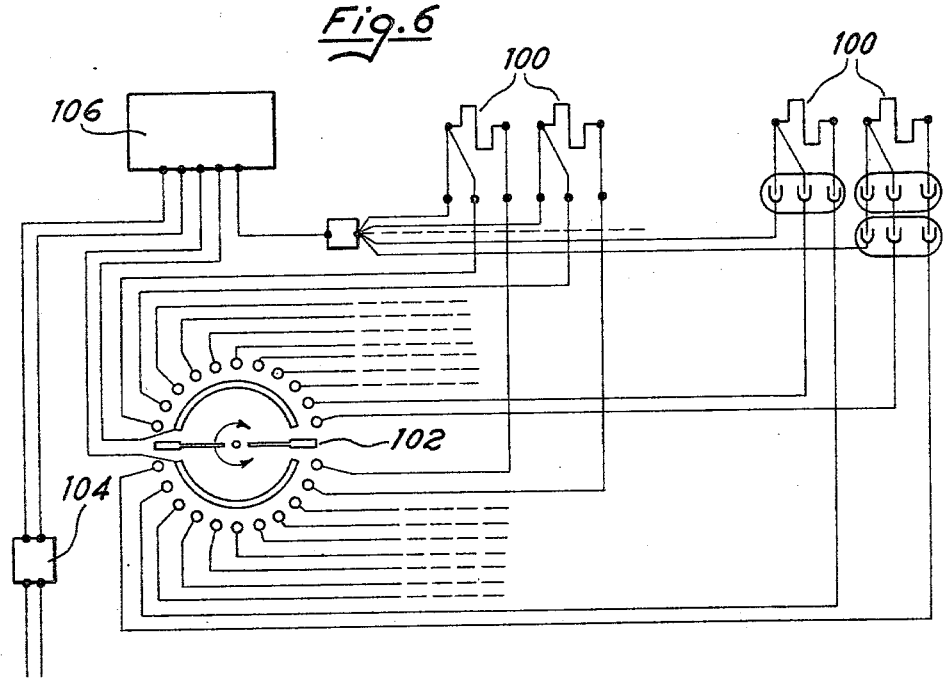
FIG. 6 is a diagram showing the connection of temperature sensors applied at different positions of the apparatus.

To check whether the operating temperatures in the different parts of the apparatus have been reached and to maintain these temperatures at the desired level, a set of thermo-resistances 100 (FIG. 6) is provided and a selector switch 102 allows each thermo-resistance to be connected to a d.c. generator 104 supplying also the indicator 106, preferably of the digital type.

The operator shall periodically turn the selector switch 102 to sequentially connect the thermo-resistances 100 to verify in this manner on an indicator 106 the temperature of the particular point of the apparatus at which the selected theremoresistance is installed.

At the end of the casting phase, which is carried out under a constant temperature control by means of the indicator 106, all the parts of the apparatus in contact with the concrete shall be opportunely cleaned. In particular, the hopper group 14 and the pumping group 36, 38, 40, 42, are subject to a washing procedure using water with suitable antifreeze additives. The casting tube, on the other hand, shall be cleaned by reducing as far as possible the use of water, but such water could be necessary for completing the cleaning process. For this purpose, the fitting 16 at the head end of the tube is disconnected and the tube is connected to a washing fixture device in the form of a tube length 110 (FIG. 4) containing two shaped rubber plugs 112 and 114, of a known type, so spaced as to define a closed and sealed space, into which a certain amount of water is introduced through a fitting 116. After the closure of the fitting 116 the tube length 110 is connected through fitting 118 to a compressed air source and the two plugs 112 and 114 with the water enclosed thereinbetween are pushed through the whole tube down to the free end where a basket is prepared to receive the plugs 112 and 114. This procedure facilitates optimal cleaning of the tube and the complete removal of any residue thanks to the combined action of the plugs 112 and 114 and the enclosed water without the tube being excessively wetted at the end of the cleaning.

It is to be understood that the shown features of the described apparatus may vary without departing from the spirit and scope of this invention.

I claim:

1. In an apparatus for pumping concrete, comprising a concrete loading hopper, pump means operably associated with the hopper for pumping concrete from the hopper and through a casting tube, and an internal combustion engine for operating the pump means, said engine being the source of a current of relatively warm air;

the improvement which comprises containing means defining an enclosure wich encloses the pump means, the hopper and the engine, and further including sectional elements defining a plurality of adjustably intercommunicating bays within which the hopper, the pump means and the engine are separately disposed; duct means for controllably circulating the relatively warm air to the exterior surfaces of the hopper and the pump means, so that the relatively warm air is in indirect heat exchange therewith; and valve means for separately controlling the air flow rate to the hopper bay, the pump means bay and the engine bay so that the air temperatures in each bay may be independently adjusted and maintanined; whereby the apparatus is adapted to operate at low environmental temperatures.

2. The apparatus of claim 1, wherein said duct means comprises a duct connecting the engine with the hopper bay and with the pump means bay; and wherein said valve means comprises: (1) a double flap valve having a first flap communicating with the duct to adjustably control the relative flow of air to the hopper bay and to the pump means by, and having a second flap operably connected to the first flap and communicating with the pump means bay and with the engine bay, to adjustably control the flow of air from the pump means bay to the engine bay; and (2) a throttle in the duct means, to separately and adjustably control the air flow rate to the hopper bay.

3. The apparatus of claim 1, which further comprises a casting tube, and valve means and conduit means for detachably connecting the exhaust pipe of said internal combustion engine to the casting tube; whereby hot exhaust gases are conducted therethrough to preheat the casting tube.

4. The apparatus of claim 3, wherein the casting tube is provided with a fitting at its outlet end to receive the conduit means; whereby the direction of flow of the hot exhaust gases during the preheating stage is countercurrent to the direction of flow of the concrete during the casting operation.

5. The apparatus of claim 4, wherein said casting tube is supported along at least a portion of its length by an articulated, positionally adjustable arm.

6. The apparatus of claim 5, which further comprises thermal insulating means enclosing a substantial portion of said casting tube.

7. The apparatus of claim 6, which further comprises an oil-driven concrete-mixing screw disposed in the hopper; hydraulic control cylinders and valve means operably connected to the support arm of the casting tube for adjusting its position; a hydraulic circuit for the oil driving the concrete-mixing screw, said circuit comprising tubes and passges for the continuous circulation of the oil in the valves controlling the movements of the tube arm; and heating means operably associated with the hydraulic circuit to heat the oil circulating therethrough.

8. The apparatus of claim 7, which is mounted on a truck, and which further comprises jacks adjustably disposed at either side and both front and rear of the truck, and controllably connected to the hydraulic circuit.

9. The apparatus of claim 8, wherein said duct means comprises a duct connecting the engine with the hopper bay and with the pump means bay; and wherein said valve means comprises; (1) a double flap valve having a first flap communicating with the duct, to adjustably control the relative flow of air to the hopper bay and to the pump means bay, and having a second flap operably connected to the first flap and communicating with the pump means bay and with the engine bay, to adjustably control the flow of air from the pump means bay to the engine bay; and (2) a throttle in the duct means, to separately and adjustably control the air flow rate to the hopper bay; and which further comprises; a plurality of temperature sensors arranged at selected points of the apparatus and individually connectable to one or more indicator instruments; whereby the temperature at said selected points are separately and selectively indicated; and a detachable device for cleaning the casting tube, and adapted to be axially mounted at the upstream end of the tube; said device comprising a tubular length containing a pair of spaced plugs forming a seal with the walls of the tube; a fitting for feeding water into the space between the two plugs; and a compressed air supply at the outer end of the length for pushing the two plugs and the water thereinbetween through the whole length of the casting tube to the downstream outlet thereof.

10. The apparatus of claim 3, which further comprises a detachable device for cleaning the casting tub, said device being adapted to be axially mounted at the upstream end of the tube; said device comprising a tubular length containing a pair of spaced plugs forming a seal with the walls of the tube; a fitting for feeding water into the space between the two plugs; and a compressed air supply at the outer end of the length for pushing the two plugs and the water thereinbetween through the whole length of the casting tube to the downstream outlet thereof.

11. An apparatus according to claim 1, which further comprises a plurality of temperature sensors arranged at selected points of the apparatus and individually connectable to one or more indicator instruments; whereby the temperature at said selected points are separately and selectively indicated.

* * * * *

UNITED STATES PATENT AND TRADEMARK OFFICE
CERTIFICATE OF CORRECTION

PATENT NO. : 4,199,002
DATED : April 22, 1980
INVENTOR(S) : ENOS FUMAGALLI

It is certified that error appears in the above-identified patent and that said Letters Patent are hereby corrected as shown below:

Column 8, line 17: reads "a detachable device for cleaning the casting tub, said"

should read -- a detachable device for cleaning the casting tube, said --

Signed and Sealed this

Nineteenth Day of August 1980

[SEAL]

Attest:

SIDNEY A. DIAMOND

Attesting Officer       Commissioner of Patents and Trademarks